United States Patent
Kwak et al.

(10) Patent No.: US 10,206,129 B2
(45) Date of Patent: Feb. 12, 2019

(54) CELLULAR RANGE EXPANSION OF BASE STATION

(71) Applicant: EMPIRE TECHNOLOGY DEVELOPMENT LLC, Wilmington, DE (US)

(72) Inventors: Jin Sam Kwak, Uiwang-si (KR); Hyun Oh Oh, Gwacheon-si (KR); Ju Hyung Son, Uiwang-si (KR)

(73) Assignee: Empire Technology Development LLC, Wilmington, DE (US)

(*) Notice: Subject to any disclaimer, the term of this patent is extended or adjusted under 35 U.S.C. 154(b) by 474 days.

(21) Appl. No.: 14/487,114

(22) Filed: Sep. 16, 2014

(65) Prior Publication Data

US 2016/0081064 A1  Mar. 17, 2016

(51) Int. Cl.
*H04W 24/08* (2009.01)
*H04W 48/16* (2009.01)

(52) U.S. Cl.
CPC .......... *H04W 24/08* (2013.01); *H04W 48/16* (2013.01)

(58) Field of Classification Search
None
See application file for complete search history.

(56) References Cited

U.S. PATENT DOCUMENTS 8,923,244 B2  12/2014  Tinnakornsrisuphap et al.
9,363,006 B2  6/2016  Bhargava et al.
(Continued)

FOREIGN PATENT DOCUMENTS

CN  102474778  5/2012
CN  103238368  8/2013
(Continued)

OTHER PUBLICATIONS

Ericsson, R2-142369, Handling of RAN assistance parameters, 3GPP TSG-RAN WG2 #86, whole document.*
(Continued)

Primary Examiner — Hanh N Nguyen
Assistant Examiner — Jose L Perez

(57) ABSTRACT

Technologies generally described herein relate to connection of a mobile device to a base station in a wireless communication system. Example mobile devices may include a receiver, a data communication module, a switch module, and a signal consolidator. The receiver may be configured to receive, from a base station through a cellular band, a first control signal including control information regarding the base station. The data communication module may be configured to communicate with the base station through a non-cellular band. The switch module may be coupled to the receiver and to the data communication module, and configured to determine that a power level of the first control signal is higher than a first threshold value and activate the data communication module in response to the determination. The data communication module may be further configured to receive a second control signal including the control information from the base station through the non-cellular band. The signal consolidator may be coupled to the receiver and the data communication module, and configured to obtain the control information regarding the base station from at least one of the received first control signal or the received second control signal.

14 Claims, 10 Drawing Sheets

(56) References Cited

U.S. PATENT DOCUMENTS

| | | | |
|---|---|---|---|
| 2012/0071160 A1* | 3/2012 | Das | H04W 48/16 455/434 |
| 2012/0269095 A1* | 10/2012 | Dalsgaard | H04W 48/16 370/255 |
| 2013/0083722 A1* | 4/2013 | Bhargava | H04W 72/085 370/315 |
| 2013/0308497 A1 | 11/2013 | Novak et al. | |
| 2014/0036853 A1 | 2/2014 | Kim et al. | |
| 2014/0269464 A1* | 9/2014 | Park | H04W 48/16 370/311 |
| 2014/0323087 A1* | 10/2014 | Huang | H04W 48/16 455/411 |
| 2015/0004971 A1* | 1/2015 | Yilmaz | H04W 36/0083 455/434 |
| 2015/0031367 A1* | 1/2015 | Singh | H04W 36/08 455/437 |
| 2015/0172977 A1* | 6/2015 | Koc | H04W 36/0083 455/437 |
| 2015/0305051 A1* | 10/2015 | Xia | H04J 3/1694 370/329 |
| 2016/0183174 A1* | 6/2016 | Xie | H04W 48/18 455/436 |

FOREIGN PATENT DOCUMENTS

| | | |
|---|---|---|
| CN | 103369677 | 10/2013 |
| CN | 103430606 | 12/2013 |
| CN | 103563454 | 2/2014 |
| KR | 1020120055671 A | 5/2012 |
| KR | 1020130008157 A | 1/2013 |
| KR | 1020130093584 A | 8/2013 |
| KR | 1020140010450 A | 1/2014 |
| WO | 2013/093174 | 6/2013 |
| WO | 2013112090 A2 | 8/2013 |

OTHER PUBLICATIONS

Stephens, R2-142731, Reply Liaison on WLAN signal measurements for WLAN/3GPP Radio interworking, 3GPP TSG RAN WG2 Meeting #86, whole document.*

Mehdi Bennis et al., "When Cellular Meets WiFi in Wireless Small Cell Networks", IEEE Communications Magazine, 2013, pp. 44-50, vol. 51, Issue 6.*

Kim et al., R2-143002, Liaison on WLAN signal measurements for WLAN/3GPP Radio interworking, 3GPP TSG RAN WG2 Meeting #87, whole document.*

Xia et al., Channel Selection to Reduce Interference to a Wireless Local Area Network from a Cellular Network, Jun. 17, 2014, U.S. Appl. No. 62/013,412 of Xia et al. U.S. Appl. No. 14/687,411 (US 2014/0269464 A1), whole document.*

Stefan Parkvall et al., "Heterogeneous Network Deployments in LTE", Ericsson Review, 2011, pp. 1-5.

"Scope and Workplan for the Study on Licensed-Assisted Access", 3GPP TSG RAN Meeting #65, RP-141421, Edinburgh, Scotland, Sep. 9-12, 2014, 13 pages.

"Supporting dual connectivity in LTE-U", 3GPP TSG RAN Meeting #65, RP-141188, Edinburgh, Scotland, Sep. 9-12, 2014, 5 pages.

* cited by examiner

CELLULAR RANGE EXPANSION OF BASE STATION

BACKGROUND

Unless otherwise indicated herein, the approaches described in this section are not prior art to the claims in this application and are not admitted to be prior art by inclusion in this section.

Recently, the demand for data traffic through a cellular network on mobile devices has been increasing. A macro-cell base station (BS) may cover a unit coverage area and have limited capability of the data traffic, and a small-cell BS (such as, for example, a micro-cell BS, a femto-cell BS, a pico-cell BS, and/or others) may cover a smaller coverage area than the unit coverage area.

SUMMARY

Technologies generally described herein relate to connection of a mobile device to a base station in a wireless communication system.

Various example mobile devices configured to connect to a base station described herein may include a receiver, a data communication module, a switching module and/or a signal consolidator. The receiver may be configured to receive a first control signal from the base station through a cellular band. The first control signal may include control information regarding the base station. The data communication module may be coupled to the receiver and configured to communicate with the base station through a non-cellular band. The switching module may be coupled to the receiver and to the data communication module. The switching module may be configured to determine that a signal strength metric of the first control signal is higher than a first threshold value; and activate the data communication module in response to determination that the signal strength metric of the first control signal is higher than the first threshold value. The data communication module may be further configured to receive a second control signal including the control information from the base station through the non-cellular band. The signal consolidator may be coupled to the receiver and the data communication module. The signal consolidator may be configured to obtain the control information regarding the base station from at least one of the received first control signal or the received second control signal. The mobile device may further include a cell selection unit coupled to the signal consolidator and configured to perform a cell selection operation based, at least in part, on the obtained control information.

In some other examples, mobile devices configured to connect to a base station described herein may include a receiver, a data communication module and/or a signal consolidator. The receiver may be configured to receive, from a base station through a cellular band, a first control signal including control information regarding the base station. The data communication module may be configured to receive, from the base station through a non-cellular band, a second control signal including the control information. The signal consolidator may be coupled to the receiver and the data communication module and configured to obtain the control information regarding the base station from at least one of the received first control signal or the received second control signal.

In some examples, example base stations to provide cellular communication to a mobile device are described. The example base stations may include a first transmitter, a signal generator and/or a second transmitter. The first transmitter may be configured to transmit, to the mobile device through a cellular band, a first control signal including control information regarding the base station. The signal generator may be configured to generate a second control signal including the control information. The second transmitter may be coupled to the signal generator and configured to transmit the second control signal to the mobile device through a non-cellular band. The example base stations may further include a power adjusting module coupled to the second transmitter and configured to adjust signal strength of the second control signal.

In some examples, methods performed under control of a mobile device are described. Example methods may include receiving, from a base station through a cellular band, a first control signal including control information regarding the base station; determining that a signal strength metric of the received first control signal is higher than a first threshold value; in response to determining that the signal strength metric of the received first control signal is higher than the first threshold value, activating a data communication module to receive a second control signal including the control information from the base station through a non-cellular band; and obtaining the control information regarding the base station from at least one of the received first control signal or the received second control signal. The example methods may further include consolidating signal strength metrics of the first and second control signals into a consolidated signal strength metric; determining that the consolidated signal strength metric is higher than a second threshold value; and in response to determination that the consolidated signal strength metric is higher than the second threshold value, connecting to the base station based, at least in part, on the obtained control information.

In some other examples, example methods performed under control of a mobile device methods may include receiving, from a base station through a cellular band, a first control signal including control information regarding the base station; receiving, from the base station through a non-cellular band, a second control signal including the control information regarding the base station; obtaining the control information regarding the base station from at least one of the received first control signal or the received second control signal; and connecting to the base station based, at least in part, on the obtained control information to perform cellular communication. The example methods may further include consolidating signal strength metrics of the first and second control signal into a consolidated signal strength metric; and determining that the consolidated signal strength metric is higher than a threshold value. The connecting to the base station includes connecting to the base station in response to determination that the consolidated signal strength metric is higher than the threshold value.

In some examples, a computer-readable storage medium is described that may be adapted to perform the above described example methods.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
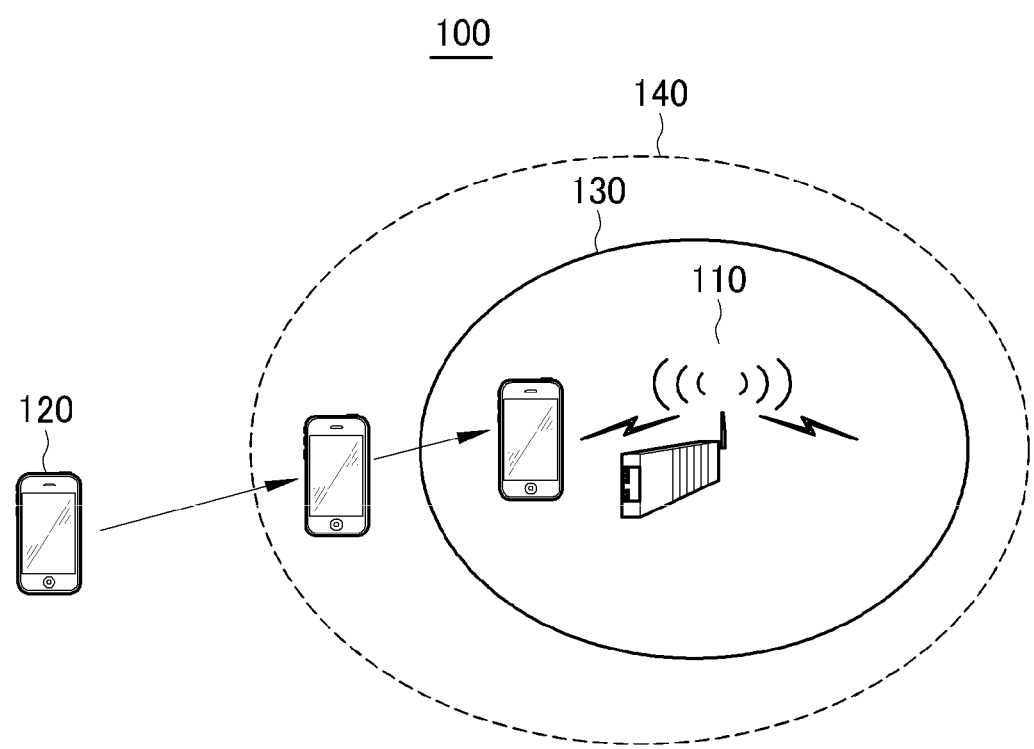
FIG. 1 shows a diagram of an example wireless communication system where a mobile device may be configured to connect to a base station.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices and computer program products related to connection to a base station.

Briefly stated, technologies are generally described for connecting a mobile device to a base station in a wireless communication system. In various examples, the base station, which may be adapted to provide cellular communication to the mobile device, may include a first transmitter, a signal generator and/or a second transmitter. The first transmitter may be configured to transmit a first control signal to the mobile device through a cellular band. The first control signal may include control information regarding the base station. The mobile device may include a receiver configured to receive, from the base station through the cellular band, the first control signal including the control information regarding the base station. The mobile device may further include a switch module, a data communication module and/or a signal consolidator. The switch module may be configured to determine that a signal strength metric of the received first control signal is higher than a threshold value and, in response to the determination, activate the data communication module.

The signal generator of the base station may be configured to generate a second control signal that also includes the control information. The second transmitter of the base station may be configured to transmit the second control signal to the mobile device through a non-cellular band, such as, for example, a wireless fidelity (WI-FI) wireless communication band or an unlicensed cellular band. The data communication module of the mobile device may be configured to receive the second control signal including the control information from the base station through the non-cellular band. The signal consolidator of the mobile device may be configured to obtain the control information from at least one of the received first control signal or the received second control signal to perform cellular communication.

FIG. 1 shows a diagram of an example wireless communication system where a mobile device may be configured to connect to a base station, arranged in accordance with at least some embodiments described herein. As depicted, a wireless communication system 100 may include one or more base stations, such as a base station 110 and/or one or more mobile devices, such as a mobile device 120. In some embodiments, wireless communication system 100 may include a cellular network system employing any suitable cellular technology including, but not limited to, Global System for Mobile communications (GSM), Code Division Multiple Access (CDMA), Long Term Evolution (LTE), Long Term Evolution-Advanced (LTE-A), Worldwide Interoperability for Microwave Access (WiMax) technology, and/or others.

In some embodiments, base station 110 may be configured to provide cellular communication to mobile device 120 located within a communication range 130. Base station 110 may provide, for example, voice and/or data communication to mobile device 120 located within communication range 130. By way of example, base station 110 may include a small-cell base station (BS), such as, a micro-cell BS, a femto-cell BS, a pico-cell BS, and/or others.

In some embodiments, base station 110 may be configured to transmit, to mobile device 120 through a cellular band and/or a non-cellular band, control signals including control information regarding base station 110. Specifically, base station 110 may be configured to transmit, to mobile device 120 through a cellular band, a first control signal including the control information regarding base station 110. Further, base station 110 may be configured to generate a second control signal including the control information and to transmit the second control signal to mobile device 120 through a non-cellular band. By way of example, the non-cellular band may include a wireless fidelity (WI-FI) wireless communication band, such as, for example, an industrial, scientific and medical (ISM) band and/or an unlicensed national information infrastructure (UNIT) band and/or some other band(s). Additionally and/or alternatively, the non-cellular band may include an unlicensed cellular band and a license exempt cellular band, such as, for example, a Long Term Evolution—Unlicensed (LTE-U) band as well as a band which is not a cellular band Additionally, base station 110 may be further configured to adjust signal strength of the second control signal such that communication range 130 may be adjusted. In some examples, base station 110 may be configured to increase the signal strength of the second control signal, thereby communication range 130 may be substantially expanded.

In some embodiments, mobile device 120 may be configured to perform cellular communication with base station 110. Mobile device 120 may be configured to receive, from base station 110, the first control signal through the cellular band and the second control signal through the non-cellular band. The first and second control signals may include the control information regarding base station 110. In some examples, when mobile device 120 is located outside of communication range 140, mobile device 120 may receive the first control signal from base station 110 through the cellular band and determine that a signal strength metric, such as a power level of the received first control signal is lower than a first threshold value. Then, if mobile device 120 moves within communication range 140, in which the signal strength metric of the received first signal is higher than the first threshold value, mobile device 120 may be configured to determine that the signal strength metric of the received first control signal is higher than the first threshold value and then activate a data communication module of mobile device 120 to further receive, from base station 110 through the non-cellular band, the second control signal including the control information regarding base station 110. By way of example, the data communication module may include a WI-FI module for wireless communication.

In some embodiments, mobile device 120 may be configured to obtain the control information regarding base station 110 from at least one of the received first control signal or the received second control signal. The control information may allow mobile device 120 to perform cellular communication with base station 110. By way of example, the control information may include connection information associated with base station 110, such as, for example, a cell ID of base station 110.

In some embodiments, mobile device 120 may be further configured to consolidate signal strength metrics of the first and second control signals into a consolidated signal strength metric. In some examples, mobile device 120 may be configured to convert the signal strength metric of the second control signal to an equivalent signal strength metric corresponding to that of the first control signal and generate the consolidated signal strength metric by adding the converted equivalent signal strength metric to that of the first control signal. When mobile device 120 is located within communication range 140 and outside of communication range 130, mobile device 120 may be configured to determine that the consolidated signal strength metric is lower than a second threshold value. That is, the consolidated signal strength may be insufficient to connect mobile device 120 to the base station 110. In some examples, the second threshold value may be predetermined to be higher than the first threshold value. Within communication range 130, mobile device 120 may be configured to determine that the consolidated signal strength metric is higher than the second threshold value, and then to connect to base station 110 based, at least in part, on the obtained control information to perform cellular communication.

Figure 2:
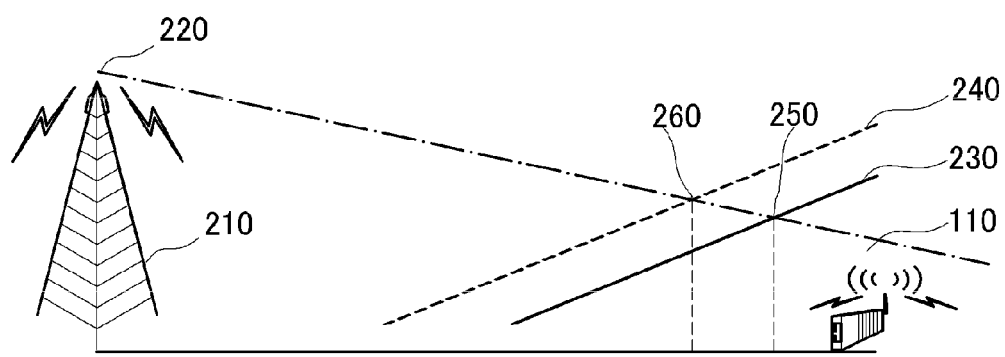
FIG. 2 shows an illustrative example of wireless communication system where a mobile device may be configured to connect to one of several base stations based on respective signal strength metrics of received signals.

FIG. 2 shows an illustrative example of wireless communication system where a mobile device may be configured to connect to one of several base stations based on respective signal strength metrics of received signals, arranged in accordance with at least some embodiments described herein. As depicted in FIG. 2, the wireless communication system may include one or more base stations, such as base stations 110 and 210.

In some embodiments, as described above referring to FIG. 1, base station 110 may be configured to transmit the first control signal including the control information regarding base station 110 through the cellular band and to transmit the second control signal including the control information through the non-cellular band. Base station 210 may be configured to transmit a third control signal including control information regarding base station 210. By way of example, base station 210 may include a macro cell BS. Signal strength of the third control signal transmitted from base station 210 may be decreased along a direction away from base station 210, and it may be graphically represented as a dashed line 220. Further, signal strength of the first control signal may be decreased along a direction away from base station 110, and it may be graphically represented as a solid line 230. If the mobile device receives the control signals only through the cellular band, the mobile device may receive the first control signal from base station 110 and the third control signal from base station 210. In such cases, when the mobile device is located in a left side of a point 250 in which the signal strength of the first control signal is lower than the signal strength of the third control signal, the mobile device located in the left side of point 250 may connect to base station 210 to perform cellular communication. Analogously, when the mobile device is located in a right side of point 250 in which the signal strength of the first control signal is higher than the signal strength of the third control signal, the mobile device may connect to base station 110 to perform cellular communication.

In some embodiments, the mobile device may be configured to receive control signals through the non-cellular band as well as the cellular band. That is, the mobile device may be configured to further receive the second control signal from base station 110 through the non-cellular band. In order to determine whether the mobile device may connect to base station 110 or base station 210, signal strength metrics of the first and second control signals transmitted from base station 110 may possibly be consolidated as a single value. That is, the mobile device may be configured to consolidate the signal strength metrics of the first and second control signals into a consolidated signal strength metric. In some examples, the signal strength metric of the second control signal transmitted from base station 110 may be converted to an equivalent signal strength metric corresponding to that of the first control signal. The signal strength metric of the second control signal may be converted to the equivalent signal strength metric, based on, for example, but not limited to, at least one of Received Signal Strength Indication (RSSI), bandwidth of the non-cellular band, load of the base station through the non-cellular band, or transmission power of the second control signal and/or other parameter(s) or combination(s) thereof. The consolidated signal strength metric may be generated, for example, by adding the converted equivalent signal strength metric to that of the first control signal.

The consolidated signal strength metric of the first and second control signals may be graphically represented as a dashed line 240. In an analogous way as described above, when the mobile device is located in a right side of a point 260, the mobile device may be configured to connect to base station 110 to perform cellular communication with base station 110. Meanwhile, when the mobile device is located in a left side of point 260, the mobile device may be configured to connect to base station 210. In this manner, the communication range of base station 110 can be substantially expanded.

In some embodiments, base station 110 may be further configured to adjust signal strength of the second control signal, and the expanded communication range of base station 110 may be adjusted accordingly. In some examples, base station 110 may be configured to increase the signal strength of the second control signal, and point 260 may be moved closer to base station 210 accordingly.

Figure 3:
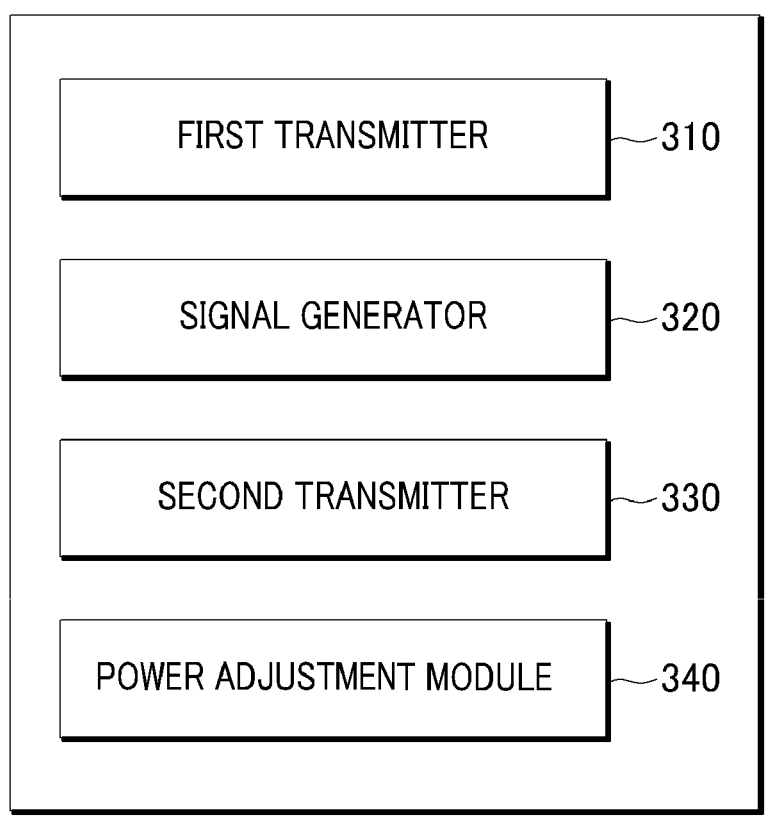
FIG. 3 shows a block diagram of an example base station configured to transmit, to a mobile device, control signals through a cellular band and a non-cellular band to provide a cellular communication to the mobile device.

FIG. 3 shows a block diagram of an example base station configured to transmit, to a mobile device, control signals through a cellular band and a non-cellular band to provide a cellular communication to the mobile device, arranged in accordance with at least some embodiments described herein. As illustrated, base station 110 may include a first transmitter 310, a signal generator 320, a second transmitter and/or a power adjustment module 340 operatively coupled to each other or otherwise in communication with each other. In some embodiments, at least some of these elements may be implemented in hardware, software, or a combination of hardware and software. In some embodiments, base station 110 may include any suitable type of base station, such as, for example, a micro-cell BS, a femto-cell BS, a pico-cell BS, and/or others, which is configured to provide cellular communication to the mobile device. The configuration of base station 110 as illustrated in FIG. 3 may be implemented in base station 110 shown in FIG. 1.

In some embodiments, first transmitter 310 may be configured to transmit a first control signal to the mobile device through a cellular band. The first control signal may be transmitted employing any suitable cellular technology including, but not limited to, GSM, CDMA, LTE, LTE-A, WiMax technology, and/or others. The first control signal may include control information regarding base station 110. The control information may allow a mobile device to perform cellular communication with base station 110. By way of example, the control information may include connection information associated with base station 110, such as, for example, a cell ID of base station 110.

In some embodiments, signal generator 320 may be configured to generate a second control signal including the control information. In some examples, signal generator 320 may be configured to generate the second control signal using, for example, a different encoding technique, code rate and/or others than those of the first control signal, such that the time diversity can be achieved.

In some embodiments, second transmitter 330 may be coupled to signal generator 320 and configured to transmit the second control signal generated by signal generator 320 to the mobile device through a non-cellular band. By way of example, non-cellular band may include a WI-FI wireless communication band, such as, for example, an ISM band and/or a UNIT band. Additionally and/or alternatively, the non-cellular band may include an unlicensed cellular band and a license exempt cellular band, such as, for example, a LTE-U band as well as a band which is not a cellular band. In some examples, each of first and second transmitters 310 and 330 may include at least one antenna, respectively. As such, two or more antennas may be used to transmit the control signals and thus, the spatial diversity can be achieved. In some embodiments, first transmitter 310 and second transmitter 330 may be integrated into a single transmitter unit that is capable to transmit at different bands.

Additionally, in some embodiments, power adjustment module 340 may be coupled to second transmitter 330 and configured to adjust signal strength of the second control signal. As described above referring to FIGS. 1 and 2, a communication range of base station 110, in which base station 110 may provide cellular communication to the mobile device located therein, may be determined based on a consolidated signal strength metric of the first control signal and the second control signal. For example, when power adjustment module 340 increases the signal strength of the second control signal, the consolidated signal strength may also be increased and thus, the communication range of base station 110 may be expanded, accordingly.

Figure 4:
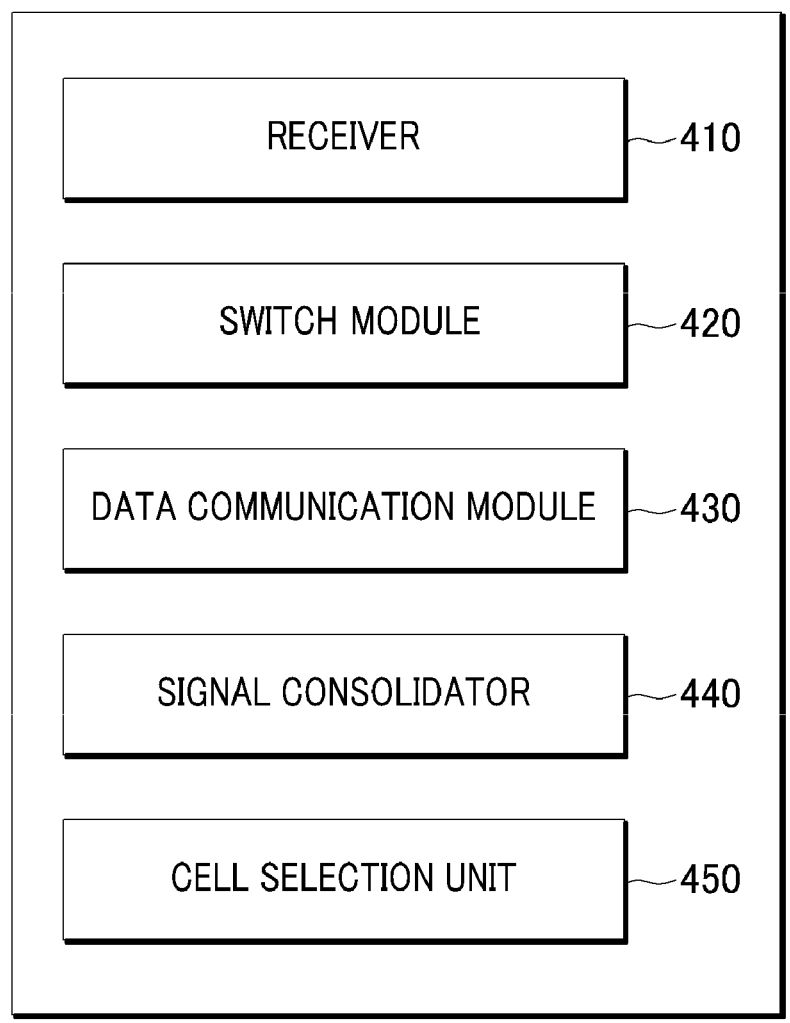
FIG. 4 shows a block diagram of an example mobile device configured to connect to a base station based on control information obtained from a received control signal.

FIG. 4 shows a block diagram of an example mobile device configured to connect to a base station based on control information obtained from a received control signal, arranged in accordance with at least some embodiments described herein. As illustrated, a mobile device 120 may include a receiver 410, a switch module 420, a data communication module 430, a signal consolidator 440 and/or a cell selection unit 450, operatively coupled to each other or otherwise in communication with each other. In some embodiments, at least some of these elements may be implemented in hardware, software, or a combination of hardware and software. In some embodiments, mobile device 120 may be implemented by any suitable type of electronic or computing device, such as, for example, a cellular phone, smart phone, personal digital assistant (PDA) and/or others, which may be equipped with cellular communication capabilities and wireless data communication capabilities.

In some embodiments, receiver 410 may be configured to receive, from a base station (such as, for example, base station 110 of FIGS. 1 and 3) through a cellular band, a first control signal including control information. In some embodiments, receiver 410 may be configured to periodically or otherwise repeatedly receive the first control signal, which may be transmitted from the base station, through a cellular band, such that mobile device 120 may connect to the base station to perform cellular communication. By way of example, the first control signal may include a downlink control signal, such as, for example, a downlink synchronization signal or a cell selection signal. In some examples, receiver 410 may be configured to receive the first control signal from at least one antenna of the base station that is configured to transmit the first control signal through the cellular band.

In some embodiments, switch module 420 may be coupled to receiver 410 and configured to determine whether a signal strength metric, such as a power level of the first control signal is higher than a first threshold value. When it is determined that the signal strength metric of the first control signal is higher than the first threshold value, switch module 420 may be configured to activate data communication module 430. In some examples, as described above referring to FIG. 1, when mobile device 120 is located within communication range 140, switch module 420 may be configured to determine that the signal strength metric of the first control signal received by receiver 410 is higher than the first threshold value and, in response to the determination, to activate data communication module 430.

In some embodiments, data communication module 430 may be coupled to switch module 420 and configured to communicate with the base station through a non-cellular band. By way of example, data communication module 430 may include a WI-FI module for wireless communication and the non-cellular band may include a WI-FI wireless communication band, such as, an ISM band and/or a UNIT band and/or other band(s). Additionally and/or alternatively, the non-cellular band may include an unlicensed cellular band and a license exempt cellular band, such as, for example, a LTE-U band as well as a band which is not a cellular band. In some embodiments, data communication module 430 may be activated by switch module 420, and then may be further configured to receive a second control signal including the control information from the base station through the non-cellular band. In some examples, data communication module 430 may be further configured to receive the second control signal from at least one antenna of the base station that is configured to transmit the second control signal through the non-cellular band.

In some embodiments, signal consolidator 440 may be coupled to receiver 410 and data communication module 430 and configured to obtain the control information regarding the base station from at least one of the received first control signal or the received second control signal. By way of example, the control information may include connection information associated with the base station, such as, for example, a cell ID of the base station.

In some embodiments, signal consolidator 440 may be further configured to consolidate signal strength metrics of the first and second control signals into a consolidated signal strength metric and determine whether the consolidated signal strength metric is higher than a second threshold value. The second threshold value may be used to determine whether the consolidated signal strength is sufficient to connect mobile device 120 to the base station. In some examples, the second threshold value may be predetermined to be higher than the first threshold value. As described above referring to FIG. 1, in some examples, when mobile device 120 is located within communication range 130, signal consolidator 440 may be configured to determine that the consolidated signal strength metric is higher than the second threshold value.

In some embodiments, signal consolidator 440 may be further configured to convert a signal strength metric of the second control signal to an equivalent signal strength metric that corresponds to that of the first control signal and generate the consolidated signal strength metric by addition of the converted equivalent signal strength metric to that of the first control signal. In some examples, signal consolidator 440 may be configured to convert the signal strength metric of the second control signal to the equivalent signal strength metric based on related parameters. By way of example, the related parameters may include at least one of RSSI bandwidth of the non-cellular band, load of the base station through the non-cellular band, or transmission power of the second control signal and/or other parameter(s) or combination(s) thereof.

In some embodiments, cell selection unit 450 may be coupled to signal consolidator 440 and configured to perform a cell selection operation based, at least in part, on the control information obtained by signal consolidator 440. In some examples, when signal consolidator 440 determines that the consolidated signal strength metric is higher than the second threshold value, cell selection unit 450 is configured to connect to the base station in response to the determination that the consolidated signal strength metric is higher than the second threshold value. In some embodiments, some of the operations performed by the switch module 420, data communication module 430, signal consolidator 440, and/or cell selection unit 450 may be performed by a single unit/module (such as by a processor or controller) rather than being performed by the discrete elements illustrated in FIG. 4.

Figure 5A:
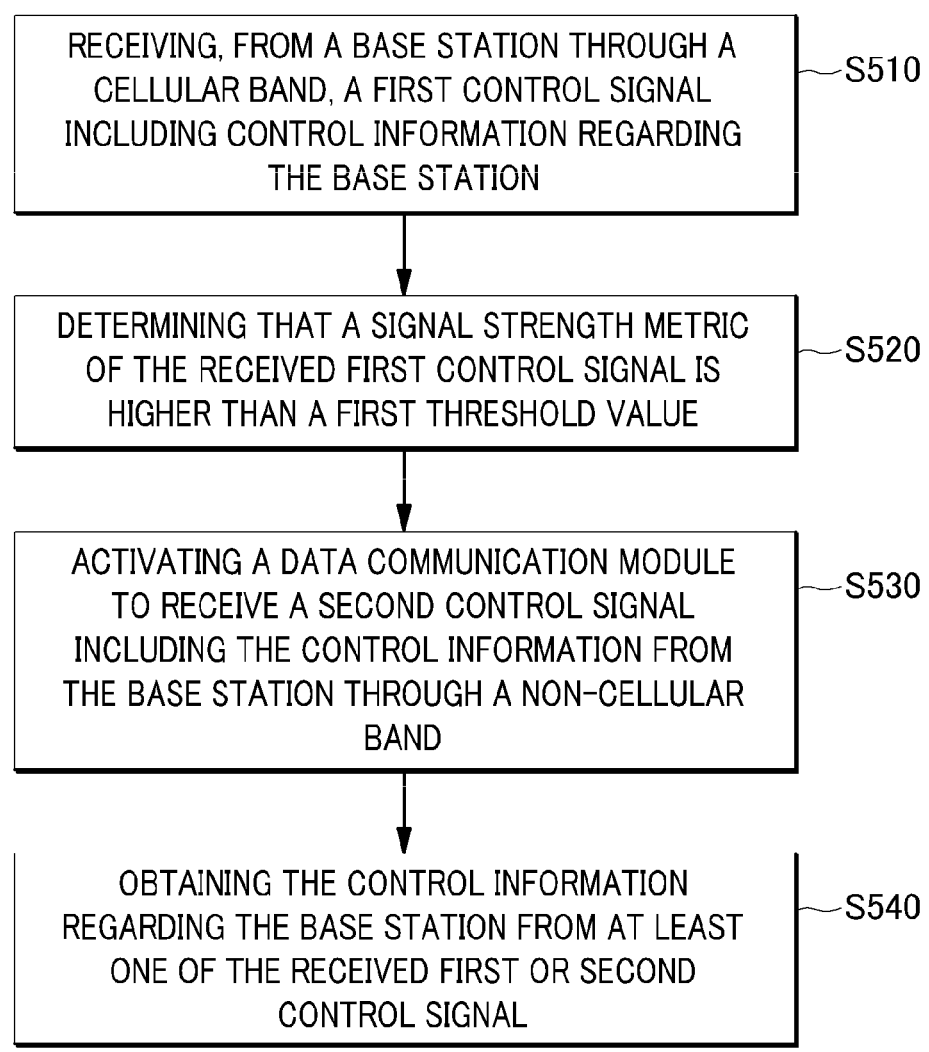
FIGS. 5A and 5B illustrate an example flow diagram of a method adapted to connect to a base station based on control information obtained from a received control signal.
Figure 5B:
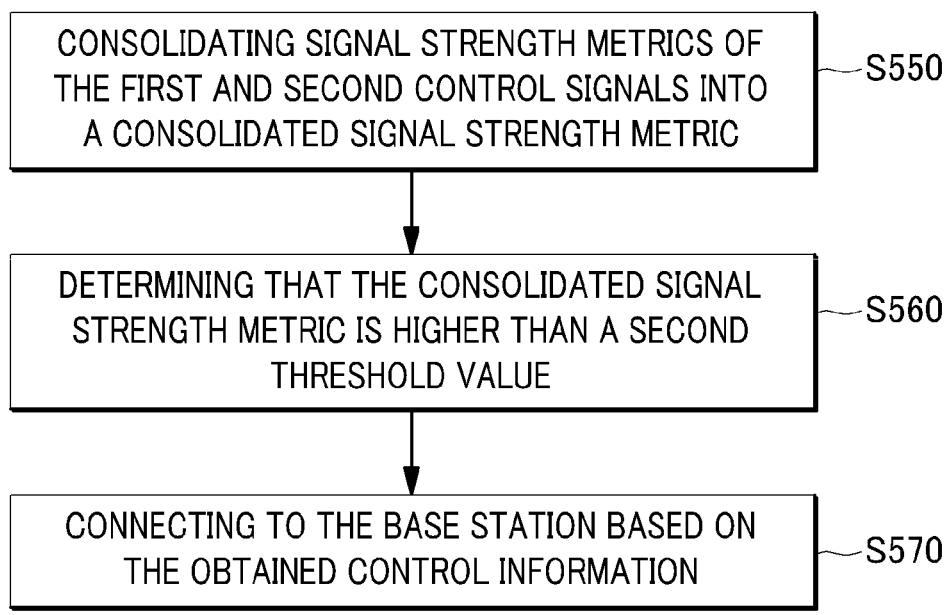

FIGS. 5A and 5B illustrate an example flow diagram of a method adapted to connect to a base station based on control information obtained from at least one of a received control signal, arranged in accordance with at least some embodiments described herein. Processes of FIGS. 5A and 5B may be implemented using, for example, mobile device 120 described with reference to FIGS. 1 and 4. Further, the processes of FIGS. 5A and 5B may be implemented as a sequential process, a parallel process, or a combination thereof.

The process of FIG. 5A may include one or more operations, actions, or functions as illustrated by one or more of blocks S510, S520, S530 and/or S540. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. The process of FIG. 5A may begin at block S510, "RECEIVING, FROM A BASE STATION THROUGH A CELLULAR BAND, A FIRST CONTROL SIGNAL INCLUDING CONTROL INFORMATION REGARDING THE BASE STATION."

At block S510, the mobile device (such as, for example, receiver 410 of mobile device 120 in FIG. 4) may receive, from a base station through a cellular band, a first control signal including control information. In some embodiments, the mobile device may periodically or otherwise repeatedly receive the first control signal through the cellular band. By way of example, the first control signal may include at least one of a downlink synchronization signal or a cell selection signal. In some embodiments, the mobile device may receive the first control signal from at least one antenna of the base station that is configured to transmit the first control signal through the cellular band. Block S510 may be followed by block S520, "DETERMINING THAT A SIGNAL STRENGTH METRIC OF THE RECEIVED FIRST CONTROL SIGNAL IS HIGHER THAN A FIRST THRESHOLD VALUE."

At block S520, the mobile device (such as, for example, switch module 420 of mobile device 120 in FIG. 4) may determine that a signal strength metric, such as a power level of the received first control signal is higher than a first threshold value. Block S520 may be followed by block S530, "ACTIVATING A DATA COMMUNICATION MODULE TO RECEIVE A SECOND CONTROL SIGNAL INCLUDING THE CONTROL INFORMATION FROM THE BASE STATION THROUGH A NON-CELLULAR BAND."

At block S530, the mobile device (such as, for example, switch module 420 of mobile device 120 in FIG. 4) may activate a data communication module in response to the determination that the signal strength metric of the received first control signal is higher than the first threshold value. The data communication module (such as, for example, data communication module 430 in FIG. 4) or receiver 410 of the mobile device may receive a second control signal including the control information from the base station through a non-cellular band. In some embodiments, the data communication module of the mobile device may receive the second control signal from at least one antenna of the base station that is configured to transmit the second control signal through the non-cellular band. By way of example, he data communication module may include a WI-FI module for wireless communication and the non-cellular band may include a WI-FI wireless communication band, such as, an ISM band and/or a UNIT band and/or other band(s). Additionally and/or alternatively, the non-cellular band may include an unlicensed cellular band and a license exempt cellular band, such as, for example, a LTE-U band as well as a band which is not a cellular band. Block S530 may be followed by block S540, "OBTAINING THE CONTROL INFORMATION REGARDING THE BASE STATION FROM AT LEAST ONE OF THE RECEIVED FIRST OR SECOND CONTROL SIGNAL."

At block S540, the mobile device (such as, for example, signal consolidator 440 of mobile device 120 in FIG. 4) may obtain the control information regarding the base station from at least one of the received first control signal or the received second control signal. By way of example, the control information may include connection information associated with the base station, such as, for example, a cell ID of the base station.

The process of FIG. 5B may include one or more operations, actions, or functions as illustrated by one or more of blocks S550, S560 and/or S570. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. The process of FIG. 5B may begin at block S550, "CONSOLIDATING SIGNAL STRENGTH METRICS OF THE FIRST AND SECOND CONTROL SIGNALS INTO A CONSOLIDATED SIGNAL STRENGTH METRIC."

At block S550, the mobile device (such as, for example, signal consolidator 440 of mobile device 120 in FIG. 4) may consolidate signal strength metric of the first and second control signals into a consolidated signal strength metric. In some embodiments, the mobile device may convert the signal strength metric of the second control signal to an equivalent signal strength metric corresponding to the signal strength metric of the first control signal. The signal strength metric of the second control signal may be converted to the equivalent signal strength metric base on, for example, but not limited thereto, at least one of RSSI bandwidth of the non-cellular band, load of the base station through the non-cellular band, or transmission power of the second control signal and/or other parameter(s) or combination(s) thereof. The mobile device may generate the consolidated signal strength metric, for example, by adding the converted equivalent signal strength metric to the signal strength metric of the first control signal. Block S550 may be followed by block S560, "DETERMINING THAT THE CONSOLIDATED SIGNAL STRENGTH METRIC IS HIGHER THAN A SECOND THRESHOLD VALUE."

At block S560, the mobile device (such as, for example, signal consolidator 440 of mobile device 120 in FIG. 4) may determine that the consolidated signal strength metric is higher than a second threshold value. The second threshold value may be used to determine whether the consolidated signal strength is sufficient to connect the mobile device to the base station. In some examples, the second threshold value may be predetermined to be higher than the first threshold value. Block S560 may be followed by block S570, "CONNECTING TO THE BASE STATION BASED ON THE OBTAINED CONTROL INFORMATION."

At block S570, in response to determination that the consolidated signal strength metric is higher than the second threshold value, the mobile device (such as, for example, cell selection unit 450 of mobile device 120 in FIG. 4) may connect to the base station based, at least in part, on the obtained control information. By way of example, but not limitation, the control information may include connection information associated with base station 110, such as, for example, a cell ID of base station 110.

Figure 6:
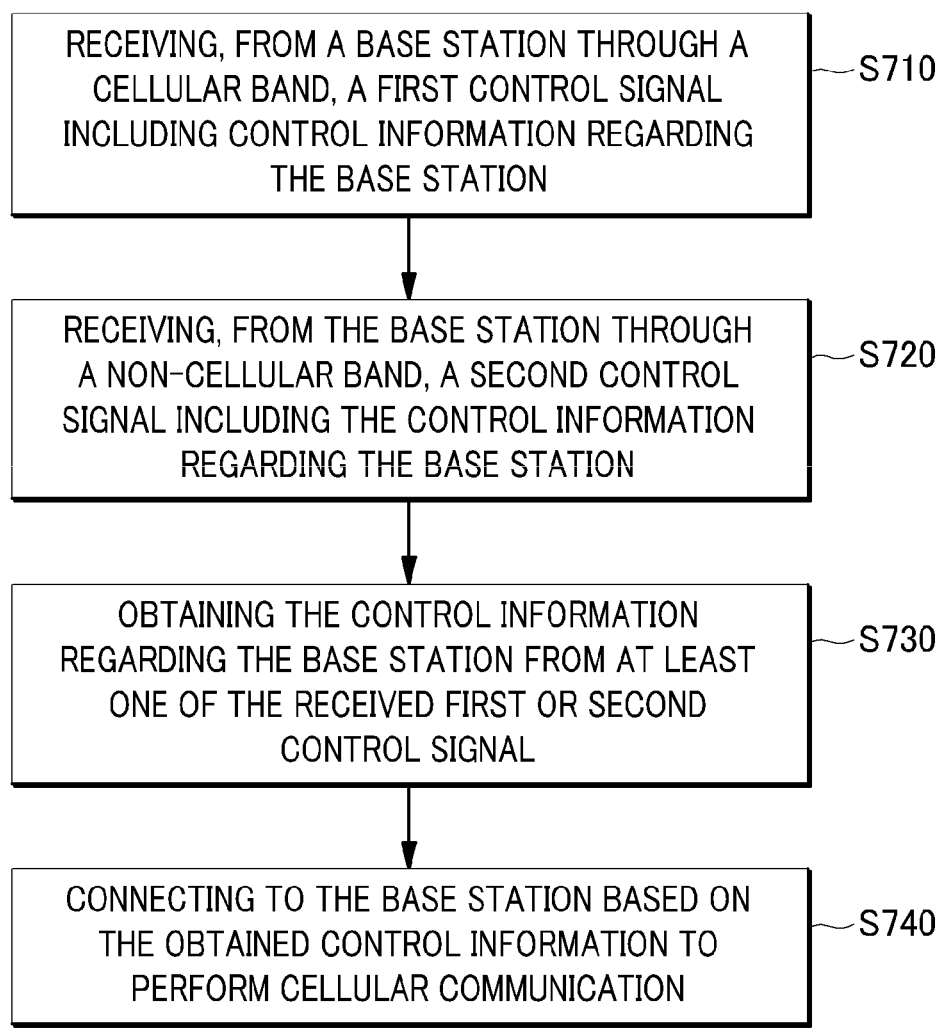
FIG. 6 illustrates another example flow diagram of a method adapted to connect to a base station based on control information obtained from a received control signal.

FIG. 6 illustrates an another example flow diagram of a method adapted to connect to a base station based on control information obtained from a received control signal, arranged in accordance with at least some embodiments described herein. The method of FIG. 6 may be implemented using, for example, mobile device 120 described with reference to FIG. 1 above.

The method of FIG. 6 may include one or more operations, actions, or functions as illustrated by one or more of blocks S610, S620, S630, and/or S640. Although illustrated as discrete blocks, various blocks may be divided into additional blocks, combined into fewer blocks, supplemented with other blocks, or eliminated, depending on the particular implementation. In some further examples, the various described blocks may be implemented as a parallel process instead of a sequential process, or as a combination thereof. The method of FIG. 6 may begin at block S610, "RECEIVING, FROM A BASE STATION THROUGH A CELLULAR BAND, A FIRST CONTROL SIGNAL INCLUDING CONTROL INFORMATION REGARDING THE BASE STATION."

At block S610, the mobile device may receive, from a base station through a cellular band, a first control signal including control information. In some embodiments, the mobile device may periodically or otherwise repeatedly receive the first control signal through the cellular band. By way of example, the first control signal may include at least one of a downlink synchronization signal or a cell selection signal. In some embodiments, the mobile device may receive the first control signal from at least one antenna of the base station that is configured to transmit the first control signal through the cellular band. Block S610 may be followed by block S620, "RECEIVING, FROM THE BASE STATION THROUGH A NON-CELLULAR BAND, A SECOND CONTROL SIGNAL INCLUDING THE CONTROL INFORMATION REGARDING THE BASE STATION."

At block S620, the mobile device may receive a second control signal including the control information from the base station through a non-cellular band. In some embodiments, the mobile device may receive the second control signal from at least one antenna of the base station that is configured to transmit the second control signal through the non-cellular band. By way of example, but not limitation, the mobile device may include a data communication module, and the data communication module may include a WI-FI module for wireless communication and the non-cellular band may include a WI-FI wireless communication band, such as, an ISM band and/or a UNIT band and/or other band(s). Additionally and/or alternatively, the non-cellular band may include an unlicensed cellular band and a license exempt cellular band, such as, for example, a LTE-U band as well as a band which is not a cellular band. Block S620 may be followed by block S630, "OBTAINING THE CONTROL INFORMATION REGARDING THE BASE STATION FROM AT LEAST ONE OF THE RECEIVED FIRST OR SECOND CONTROL SIGNAL."

At block S630, the mobile device may obtain the control information regarding the base station from at least one of the received first control signal or the received second control signal. By way of example, but not limitation, the control information may include connection information associated with the base station, such as, for example, a cell ID of the base station. Block S630 may be followed by block S640, "CONNECTING TO THE BASE STATION BASED

ON THE OBTAINED CONTROL INFORMATION TO PERFORM CELLULAR COMMUNICATION."

At block S640, the mobile device may connect to the base station based, at least in part, on the obtained control information to perform cellular communication. In some embodiments, the mobile device may consolidate signal strength metrics of the first and second control signals into a consolidated signal strength metric, and determining that the consolidated signal strength metric is higher than a threshold value. The threshold value may be used to determine whether the consolidated signal strength is sufficient to connect the mobile device to the base station. In some examples, the mobile device may connect to the base station in response to determination that the consolidated signal strength metric is higher than the threshold value.

Figure 7:
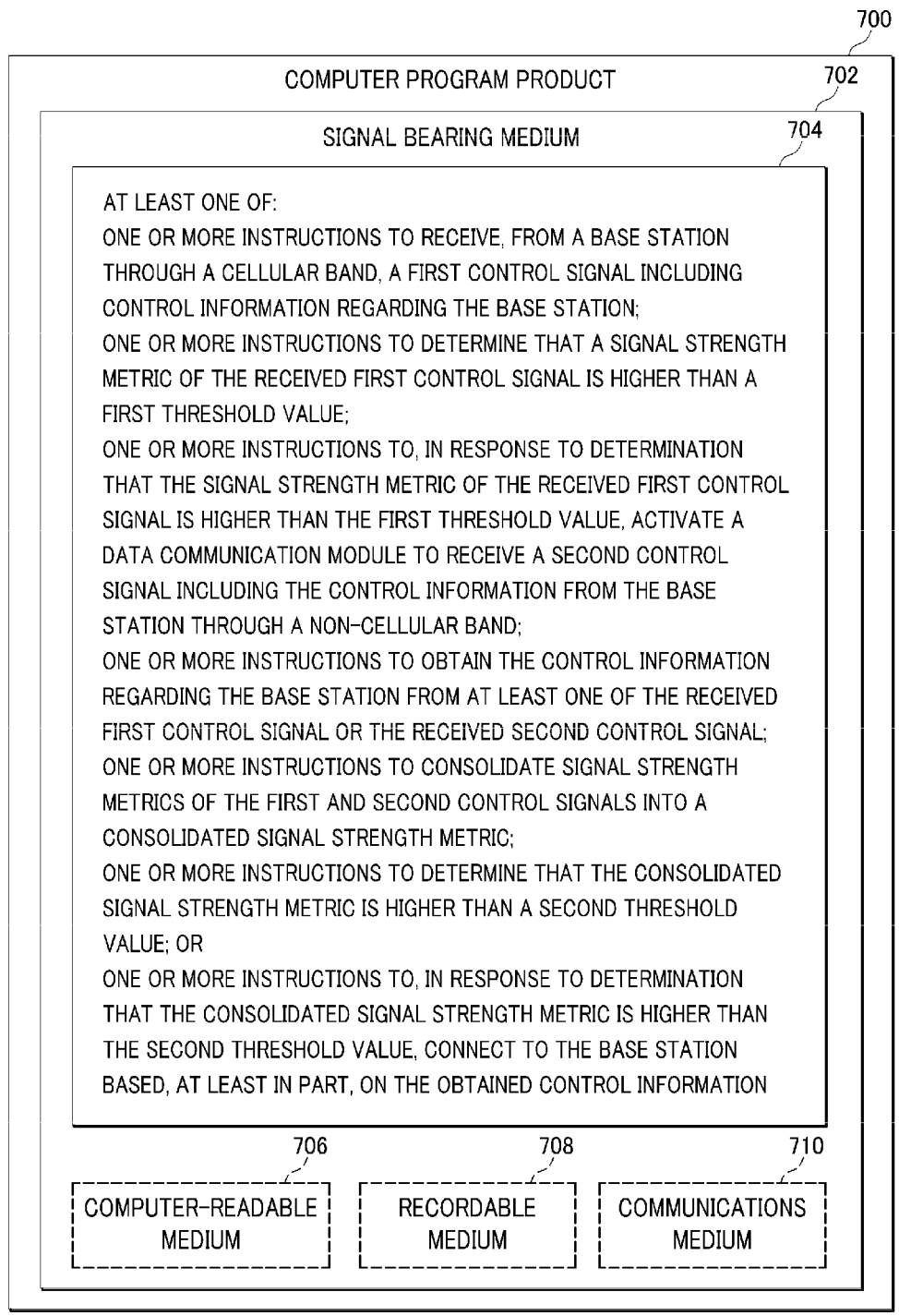
FIG. 7 illustrates computer program products that can be utilized to connect to a base station based on control information obtained from a received control signal.

In light of the present disclosure, for this and other methods disclosed herein, the functions and operations performed in the methods may be implemented in differing order. Furthermore, the outlined operations are only provided as examples, and some of the operations may be optional, combined into fewer operations, supplemented with other operations, or expanded into additional operations without detracting from the essence of the disclosed embodiments FIG. 7 illustrates computer program products that can be utilized to connect to a base station based on control information obtained from a received control signal, in accordance with at least some embodiments described herein. Program product 700 may include a signal bearing medium 702. Signal bearing medium 702 may include one or more instructions 704 that, in response to execution by, for example, a processor may provide the functionality and features described above with respect to FIGS. 1 and 4-6. By way of example, instructions 704 may include at least one of: one or more instructions to receive, from a base station through a cellular band, a first control signal including control information regarding the base station; one or more instructions to determine that a signal strength metric of the received first control signal is higher than a first threshold value; one or more instructions to, in response to determination that the signal strength metric of the received first control signal is higher than the first threshold value, activate a data communication module to receive a second control signal including the control information from the base station through a non-cellular band; one or more instructions to obtain the control information regarding the base station from at least one of the received first control signal or the received second control signal; one or more instructions to consolidate signal strength metrics of the first and second control signals into a consolidated signal strength metric; one or more instructions to determine that the consolidated signal strength metric is higher than a second threshold value; or one or more instructions to, in response to determination that the consolidated signal strength metric is higher than the second threshold value, connect to the base station based, at least in part, on the obtained control information. Thus, for example, referring to FIG. 1 or FIG. 4, mobile device 120 may undertake one or more of the blocks shown in FIGS. 5A and 5B in response to instructions 704.

In some implementations, signal bearing medium 702 may encompass a non-transitory computer-readable medium 706, such as, but not limited to, a hard disk drive, a compact disc (CD), a digital video disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, program product 700 may be conveyed to one or more modules of mobile device 120 by an RF signal bearing medium 702, where the signal bearing medium 702 is conveyed by a wireless communications medium 710 (e.g., a wireless communications medium conforming with the IEEE 802.11 standard).

Figure 8:
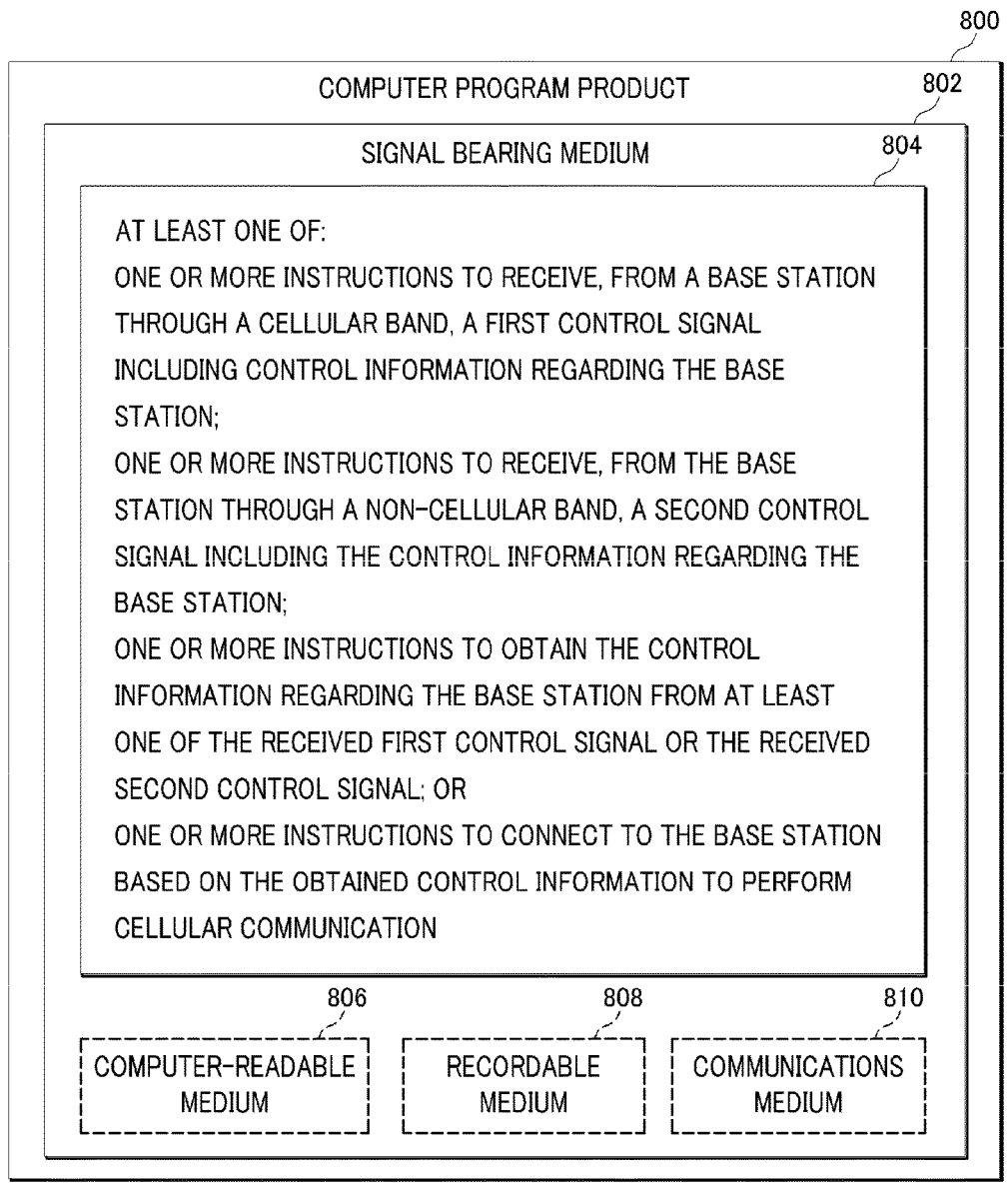
FIG. 8 illustrates another computer program product that can be utilized to connect to a base station based on control information obtained from a received control signal.

FIG. 8 illustrates another computer program product that can be utilized to connect to a base station based on control information obtained from a received control signal, in accordance with at least some embodiments described herein. Program product 800 may include a signal bearing medium 802. Signal bearing medium 802 may include one or more instructions 804 that, in response to execution by, for example, a processor may provide the functionality and features described above with respect to FIGS. 1 and 4-6. By way of example, instructions 804 may include at least one of: one or more instructions to receive, from a base station through a cellular band, a first control signal including control information regarding the base station; one or more instructions to receive, from the base station through a non-cellular band, a second control signal including the control information regarding the base station; one or more instructions to obtain the control information regarding the base station from at least one of the received first control signal or the received second control signal; or one or more instructions to connect to the base station based on the obtained control information to perform cellular communication. Thus, for example, referring to FIG. 1 or FIG. 4, mobile device 120 may undertake one or more of the blocks shown in FIG. 6 in response to instructions 704.

In some implementations, signal bearing medium 802 may encompass a non-transitory computer-readable medium 806, such as, but not limited to, a hard disk drive, a compact disc (CD), a digital video disk (DVD), a digital tape, memory, etc. In some implementations, signal bearing medium 802 may encompass a recordable medium 808, such as, but not limited to, memory, read/write (R/W) CDs, R/W DVDs, etc. In some implementations, signal bearing medium 802 may encompass a communications medium 810, such as, but not limited to, a digital and/or an analog communication medium (e.g., a fiber optic cable, a waveguide, a wired communications link, a wireless communication link, etc.). Thus, for example, program product 800 may be conveyed to one or more modules of mobile device 120 by an RF signal bearing medium 802, where the signal bearing medium 802 is conveyed by a wireless communications medium 810 (e.g., a wireless communications medium conforming with the IEEE 802.11 standard).

Figure 9:
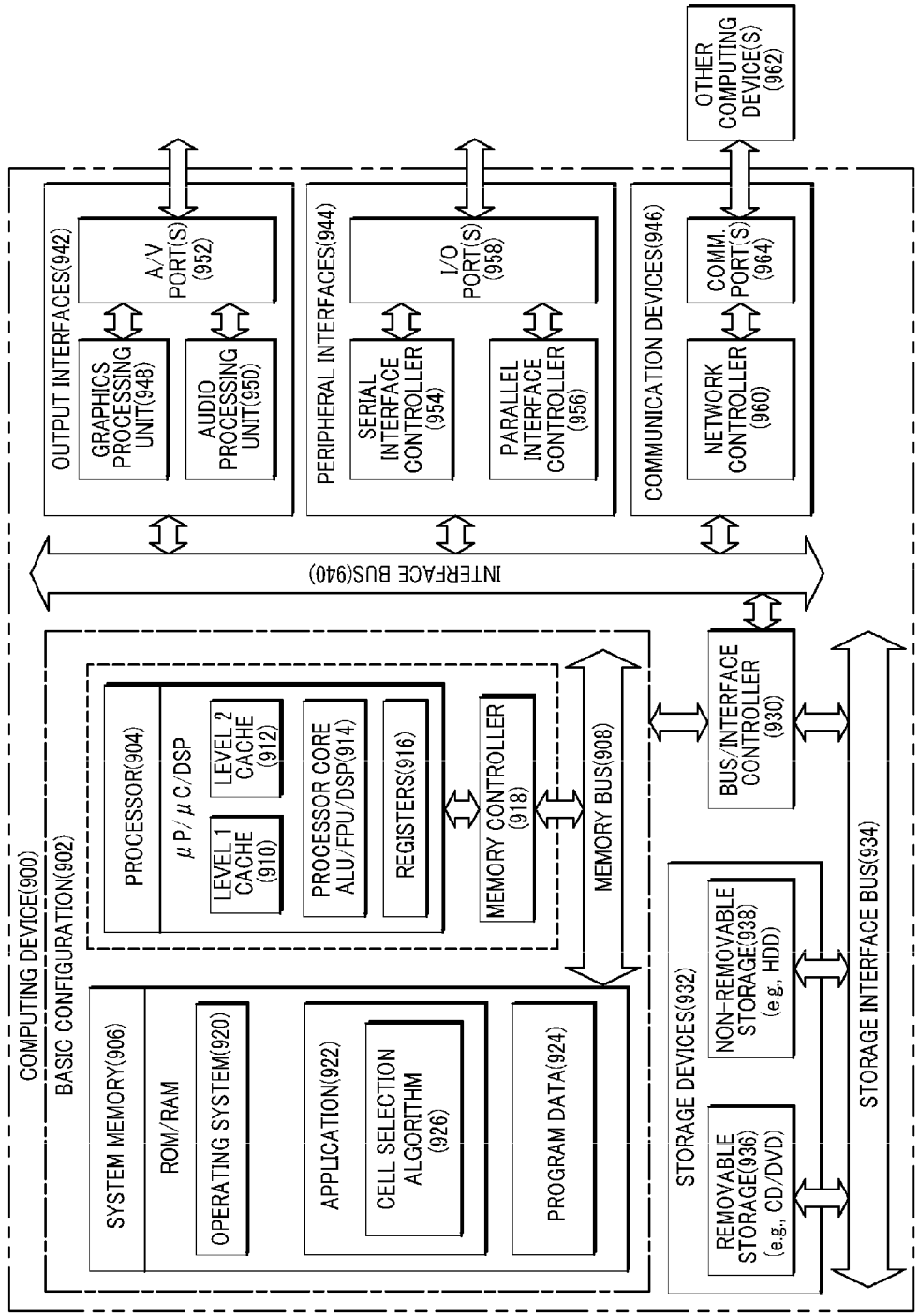
FIG. 9 shows a block diagram of an example computing device that can be configured to connect to a base station in a wireless communication system; all arranged in accordance with at least some embodiments described herein.

FIG. 9 shows a block diagram of an example computing device that can be configured to connect to a base station in a wireless communication system, arranged in accordance with at least some embodiments described herein. For instance, computing device 900 may be implemented in a mobile device, such as mobile device 120 described above.

In a very basic configuration 902, computing device 900 typically includes one or more processors 904 and a system memory 906. A memory bus 908 may be used for communicating between processor 904 and system memory 906.

Depending on the desired configuration, processor 904 may be of any type including but not limited to a microprocessor (µP), a microcontroller (µC), a digital signal processor (DSP), or any combination thereof. Processor 904 may include one or more levels of caching, such as a level one cache 910 and a level two cache 912, a processor core 914, and registers 916. An example processor core 914 may include an arithmetic logic unit (ALU), a floating point unit (FPU), a digital signal processing core (DSP core), or any combination thereof. An example memory controller 918 may also be used with processor 904, or in some implementations memory controller 918 may be an internal part of processor 904.

Depending on the desired configuration, system memory 906 may be of any type including but not limited to volatile memory (such as RAM), non-volatile memory (such as ROM, flash memory, etc.) or any combination thereof. System memory 906 may include an operating system 920, an application 922, and program data 924.

Application 922 may include a cell selection algorithm 926 that may be arranged to perform the functions and operations as described herein including the actions described with respect to mobile device 120 as shown in FIGS. 1 and 4 or including the actions described with respect to the flow charts shown in FIGS. 5-6. Program data 924 may include any data that may be useful for providing the base station connection scheme as is described herein. In some examples, operating system 920 and/or application 922 may be arranged to operate with program data 924 such that the base station connection scheme as described herein may be performed.

Computing device 900 may have additional features or functionality, and additional interfaces to facilitate communications between basic configuration 902 and any required devices and interfaces. For example, a bus/interface controller 930 may be used to facilitate communications between basic configuration 902 and one or more data storage devices 932 via a storage interface bus 934. Data storage devices 932 may be removable storage devices 936, non-removable storage devices 938, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 906, removable storage devices 936 and non-removable storage devices 938 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 900. Any such computer storage media may be part of computing device 900.

Computing device 900 may also include an interface bus 940 for facilitating communication from various interface devices (e.g., output devices 942, peripheral interfaces 944, and communication devices 946) to basic configuration 902 via bus/interface controller 930. Example output interfaces 942 include a graphics processing unit 948 and an audio processing unit 950, which may be configured to communicate to various external devices such as a display or speakers via one or more AN ports 952. Example peripheral interfaces 944 include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 946 includes a network controller 960, which may be arranged to facilitate communications with one or more other computing devices 962 over a network communication link via one or more communication ports 964.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 900 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 900 may also be implemented as a personal computer including both laptop computer and non-laptop computer configurations.

The present disclosure is not to be limited in terms of the particular embodiments described in this application, which are intended as illustrations of various aspects. Many modifications and variations may be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, reagents, compounds, compositions or biological systems, which can, of course, vary. The terminology used herein is for the purpose of describing particular embodiments only, and is not intended to be limiting.

The herein described subject matter sometimes illustrates different components contained within, or connected with, different other components. Such depicted architectures are merely examples, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, various embodiments of the present disclosure have been described herein for purposes of illustration, and various modifications may be made without departing from the scope and spirit of the present disclosure. Accordingly, the various embodiments disclosed herein are not intended to be limiting, with the true scope and spirit being indicated by the following claims.

What is claimed is:

1. A method performed under control of a mobile device to enable the mobile device to select a small-cell base station for data communication, the method comprising:

receiving, from the small-cell base station through a cellular band, a first control signal that includes control information regarding the small-cell base station;

determining that a first value of a first power level of the first control signal is higher than a first threshold value, wherein the first value is associated with a first location distanced from and within a communication range of the small-cell base station;

in response at least, in part, to the determination that the first value of the first power level is higher than the first threshold value, receiving, from the small-cell base station through a WI-FI frequency band, a second control signal that includes the control information regarding the small-cell base station;

determining a second value of a second power level of the second control signal;

adding the second value to the first value to generate a consolidated value, wherein the consolidated value is associated with a second location distanced from and within the communication range of the small-cell base station, and wherein the second location is distanced further from the small-cell base station than the first location;

receiving, at the second location and from a macro-cell base station, a third control signal with a third power level that has a third value, wherein the third value is higher than the first value at the second location;

connecting to the small-cell base station for the data communication, in a first area, between the second location and the first location, in which the third value in the first area is higher than the first value in the first area and lower than the consolidated value in the first area, such that the small-cell base station is selected over the macro-cell base station for the data communication while the mobile device is in the first area; and connecting to the macro-cell base station for the data communication, in a second area, between the second location and the macro-cell base station, in which the third value in the second area is higher than both the first value in the second area and the consolidated value in the second area, such that the macro-cell base station is selected over the small-cell base station for the data communication while the mobile device is in the second area.

2. The method of claim 1, wherein receiving the first control signal and the second control signal from the small-cell base station includes receiving the first control signal and the second control signal from one of: a micro-cell base station, a femto-cell base station, or a pico-cell base station.

3. The method of claim 1, wherein:
receiving the first control signal from the small-cell base station includes receiving the first control signal from at least one antenna of the small-cell base station that is configured to transmit the first control signal through the cellular band, and
receiving the second control signal from the small-cell base station includes receiving the second control signal from at least one antenna of the small-cell base station that is configured to transmit the second control signal through the WI-FI frequency band.

4. The method of claim 1, wherein receiving the first control signal includes receiving at least one of: a downlink synchronization signal or a cell selection signal.

5. The method of claim 1, further comprising obtaining the control information regarding the small-cell base station from at least one of the first control signal or the second control signal, wherein obtaining the control information includes obtaining connection information associated with the small-cell base station.

6. A method performed under control of a mobile device to enable the mobile device to select connection to a small-cell base station or to a macro-cell base station for data communication, the method comprising:
receiving, from the small-cell base station through a cellular band, a first control signal that includes control information regarding the small-cell base station;
receiving, from the small-cell base station through a another frequency band, a second control signal that includes the control information regarding the small-cell base station;
receiving, from the macro-cell base station, a third control signal that includes control information regarding the macro-cell base station;
determining a first value of a first power level of the first control signal, wherein the first value is associated with a first location distanced from and within a communication range of the small-cell base station;
determining a second value of a second power level of the second control signal;
determining a third value of a third power level of the third control signal;
adding the second value to the first value to generate a consolidated value, wherein the consolidated value is associated with a second location distanced from and within the communication range of the small-cell base station, and wherein the second location is distanced further from the small-cell base station than the first location;
in a first area between the second location and the first location, determining whether the consolidated value in the first area is higher than the third value in the first area;
while in the first area, connecting to the small-cell base station for the data communication, in response to a determination that the consolidated value in the first area is higher than the third value in the first area, wherein the third value in the first area is higher than the first value in the first area;
in a second area between the second location and the macro-cell base station, determining whether the consolidated value in the second area is lower than the third value in the second area; and
while in the second area, connecting to the macro-cell base station, in response to a determination that the consolidated value in the second area is lower than the third value in the second area.

7. A mobile device, comprising:
a receiver configured to receive, from a small-cell base station through a cellular band, a first control signal that includes control information regarding the small-cell base station;
a data communication port configured to communicate with the small-cell base station through a another frequency band;
a switch coupled to the receiver and to the data communication port, and configured to:
determine that a first value of a first power level of the first control signal is higher than a first threshold value, wherein the first value is associated with a first location distanced from and within a communication range of the small-cell base station; and
activate the data communication port, in response to the determination that the first value of the first power level is higher than the first threshold value,
wherein the data communication port is configured to receive, from the small-cell base station through the another frequency band, a second control signal that includes the control information regarding the small-cell base station; and
a processor coupled to the receiver and the data communication port, and configured to perform or control performance of operations that include:
determine a second value of a second power level of the second control signal;
add the second value to the first value to generate a consolidated value, wherein the consolidated value is associated with a second location distanced from and within the communication range of the small-cell base station, and wherein the second location is distanced further from the small-cell base station than the first location,
wherein the receiver is further configured to receive, at the second location and from a macro-cell base station, a third control signal with a third power level that has a third value, wherein the third value is higher than the first value at the second location;
connect the mobile device to the small-cell base station for data communication, in a first area, between the second location and the first location, in which the third value in the first area is higher than the first value in the first area and lower than the consolidated value in the first area such that the small-cell base station is selected by the processor over the macro-cell base station for the data communication while the mobile device is in the first area; and
connect the mobile device to the macro-cell base station for the data communication, in a second area, between the second location and the macro-cell base station, in which the third value in the second area is higher than both the first value in the second area and the consolidated value in the second area such that the macro-cell base station is selected by the processor over the small-cell base station for the data communication while the mobile device is in the second area.

8. The mobile device of claim 7, wherein the control information includes a cell identification (ID) associated with the small-cell base station.

9. A mobile device, comprising:
a receiver configured to receive, from a small-cell base station through a cellular band, a first control signal that includes control information regarding the small-cell base station, wherein the control information includes connection information usable by the mobile device to for data communication with the small-cell base station via the cellular band;
a data communication port configured to receive, from the small-cell base station through a another frequency band, a second control signal that includes the control information regarding the small-cell base station,
wherein the receiver is further configured to receive, from a macro-cell base station, a third control signal that includes control information regarding the macro-cell base station; and
a processor coupled to the receiver and the data communication port, and configured to perform or control performance of operations that include:
determine a first value of a first power level of the first control signal, wherein the first value is associated with a first location distanced from and within a communication range of the small-cell base station;
determine a second value of a metric power level of the second control signal;
determine a third value of a third power level of the third control signal;
add the second value to the first value to generate a consolidated value, wherein the consolidated value is associated with a second location distanced from and within the communication range of the small-cell base station, and wherein the second location is distanced further from the small-cell base station than the first location;
in a first area between the second location and the first location, determine whether the consolidated value in the first area is higher than the third value in the first area;
while in the first area, connect the mobile device to the small-cell base station for the data communication, in response to a determination that the consolidated value in the first area is higher than the third value in the first area, wherein the third value in the first area is higher than the first value in the first area;
in a second area between the second location and the macro-cell base station, determine whether the consolidated value in the second area is lower than the third value in the second area; and
while in the second area, connect the mobile device to the macro-cell base station, in response to a determination that the consolidated value in the second area is lower than the third value in the second area.

10. The mobile device of claim 9, wherein the data communication port includes a WI-FI frequency communication interface.

11. A non-transitory computer-readable storage medium which stores a program executable by one or more processors of the mobile device to perform or cause to be performed the method of claim 1.

12. A small-cell base station to provide cellular communication to a mobile device, the small-cell base station comprising:
a first transmitter configured to transmit, to the mobile device through a cellular band, a first control signal with a first power level having a first value, wherein the first value is associated with a first location distanced from and within a communication range of the small-cell base station, wherein the first control signal includes control information regarding the small-cell base station, and wherein the control information includes connection information usable by the mobile device for data communication with the small-cell base station via the cellular band;
a signal generator configured to generate a second control signal with a second power level having a second value, wherein the second control signal includes the control information regarding the small-cell base station;
a second transmitter coupled to the signal generator and configured to transmit the second control signal to the mobile device through a another frequency band;
hardware coupled to the second transmitter and configured to increase the second value of the second power level of the second control signal to increase a consolidated value that is based on the second value added to the first value; and
a receiver configured to establish a connection with the mobile device by use of the control information to facilitate the data communication between the mobile device and the small-cell base station via the cellular band, wherein:
the increased consolidated value is associated with a second location distanced from and within the communication range of the small-cell base station,
the second location is distanced further from the small-cell base station than the first location,
the mobile device receives, at the second location and from a macro-cell base station, a third control signal with a third power level that has a third value higher than the first value at the second location,
the connection is established between the small-cell base station and the mobile device for the data communication, in a first area, between the second location and the first location, in which the third value in the first area is higher than the first value in the first area and lower than the increased consolidated value in the first area, such that the small-cell base station is selected over the macro-cell base station for the data communication while the mobile device is in the first area; and
the mobile device connects to the macro-cell base station for the data communication, in a second area, between the second location and the macro-cell base station, in which the third value in the second area is higher than both the first value in the second area and the increased consolidated value in the second area, such that the macro-cell base station is selected over the small-cell base station for the data communication while the mobile device is in the second area.

13. The small-cell base station of claim 12, wherein the small-cell base station includes at least one of: a micro-cell base station, a femto-cell base station, or a pico-cell base station.

14. The small-cell base station of claim 12, wherein the control information includes a cell identification (ID) associated with the small-cell base station.

* * * * *

UNITED STATES PATENT AND TRADEMARK OFFICE
CERTIFICATE OF CORRECTION

PATENT NO. : 10,206,129 B2
APPLICATION NO. : 14/487114
DATED : February 12, 2019
INVENTOR(S) : Kwak et al.

It is certified that error appears in the above-identified patent and that said Letters Patent is hereby corrected as shown below:

In the Claims

In Column 19, Line 39, Claim 6: please delete "through a" and insert -- through -- therefor.

In Column 21, Line 12, Claim 9: please delete "device to" and insert -- device -- therefor.

In Column 21, Line 31, Claim 9: please delete "metric" and insert -- second -- therefor.

In Column 22, Line 21, Claim 12: please delete "through a another" and insert -- through another -- therefor.

Signed and Sealed this
Fourteenth Day of September, 2021

Drew Hirshfeld
*Performing the Functions and Duties of the
Under Secretary of Commerce for Intellectual Property and
Director of the United States Patent and Trademark Office*